Sept. 24, 1935.  C. A. SCHMIDT  2,015,643
HOT AIR HEATER
Original Filed Sept. 20, 1930
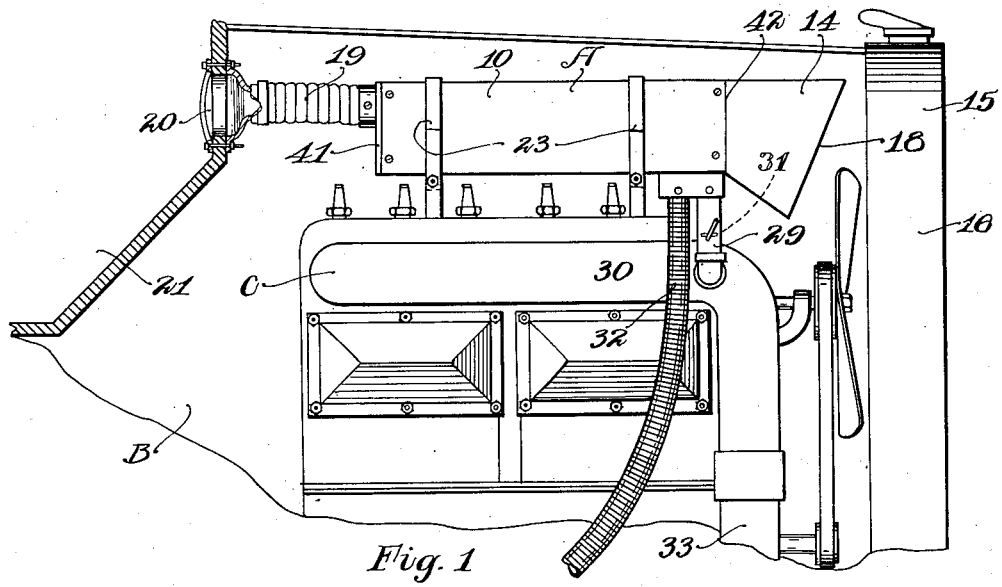
Fig. 1
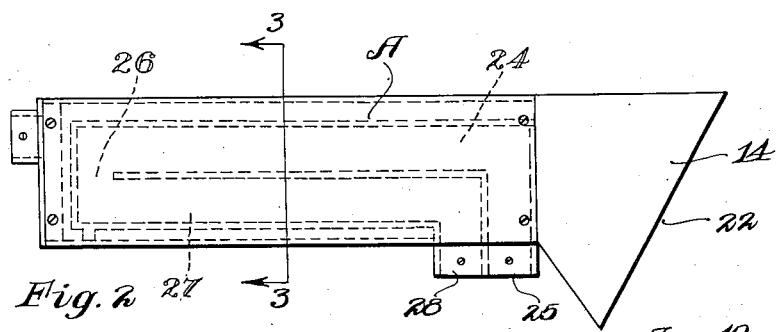
Fig. 2
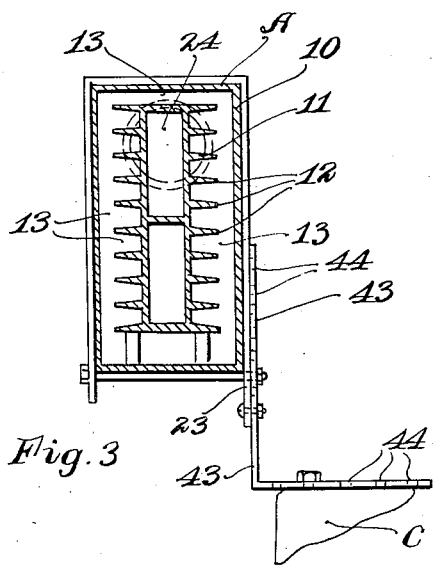
Fig. 3
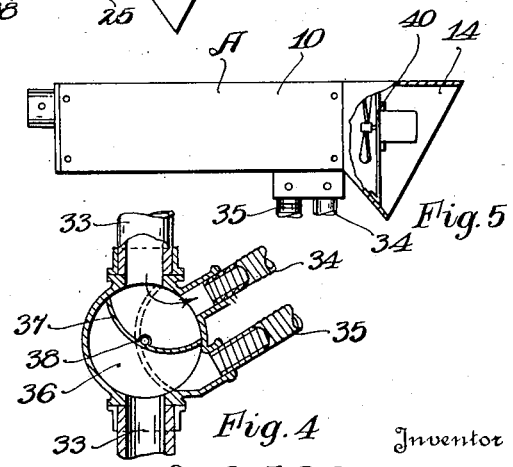
Fig. 5
Fig. 4
Inventor
Carl A. Schmidt
By Howard Fischer
Attorney Patented Sept. 24, 1935

2,015,643

UNITED STATES PATENT OFFICE 2,015,643

HOT AIR HEATER

Carl A. Schmidt, St. Paul, Minn., assignor to Ashco Corporation, St. Paul, Minn., a corporation of Minnesota Application September 20, 1930, Serial No. 483,283
Renewed June 15, 1934

2 Claims. (Cl. 257—241)

My invention relates to hot air heaters for automobiles or motor vehicles where it is desired to utilize the heat from the exhaust of the internal combustion engine and in an efficient manner direct hot air into the vehicle.

A feature of my heater resides in a heating radiator which is connected directly to the exhaust manifold of the internal combustion engine so that the radiator may be heated by the exhaust virtually instantly with the starting of the internal combustion engine. The radiator is placed in close proximity to the exhaust manifold and engine.

Further, my heater includes a radiator which is heated by the exhaust of an internal combustion engine and about which an air jacket is provided which is adapted to carry a draft of air over the heating radiator. The air jacket is formed with an air receiving funnel-like portion which extends in close proximity to the air circuiting fan of the internal combustion engine and the upper part of the radiator. Thus air which passes over the hottest portion of the radiator is directed and forced into the air passageway over the exhaust radiator and by means of a suitable connection is carried back into the body of the vehicle. The cooling fan for the internal combustion engine assists in forcing air through the air passageway about the radiator. A suitable air fan may be placed within the air receiving end of the air casing which extends about the radiator to force the air over the radiator and into the vehicle.

Features peculiar to the heater and the operation thereof, together with a fuller explanation of the objects and purpose of the same will be fully and clearly brought out.

In the drawing forming part of this specification:

Figure 1 is a diagrammatic side elevation of a portion of a motor vehicle, showing the internal combustion engine and my heater connected thereto.

Figure 2 is a side view of the heater removed from the motor vehicle.

Figure 3 is a section on the line 3—3 of Figure 2, also showing one of the brackets for supporting the heater.

Figure 4 is a section of an exhaust control valve which may be used with my heater.

Figure 5 is a detail in reduced size of my heater where an air circulating fan and motor are employed.

The drawing illustrates my hot air heater A which is provided with an outer casing 10 which incloses the heater radiator 11. The radiator 11 is formed with a series of heat dispensing fins 12 which project from the sides of the same.

The radiator 11 is spaced away from the inside walls of the casing 10 in a manner so as to form an air circulating passageway 13 around the entire radiator 11. An enlarged funnel-like air intake tube 14 is provided in the front of the casing 10 which directs the air from the upper portion 15 of the radiator 16 of the motor vehicle B into the air passageway 13 of the heater A. The air coming from the upper part 15 of the radiator 16 is ordinarily warm owing to the fact that this is the hottest part of the radiator 16 and by means of the air circulating fan 17 of the internal combustion engine C being closely positioned to the intake opening 18 of the tube 14, air is caused to be forced into the air passageways 13 about the radiator 11 and through the casing 10, and from the rear end of the casing 10 the hot air will pass through the tube 19 and through the register 20 into the passenger compartment 21 of the vehicle B.

When the motor vehicle B is in motion, air passing through the radiator 16 will be caused to be forced through the heater A and from the register 20 into the passenger compartment. This will assist the fan 17 in driving air through the heater A into the motor vehicle body. The tube 14 may be beveled off on its open edge 22 to incline away from the radiator 16. This permits the tube 14 to be brought into close relation to the fan 17.

The heater A is supported by the brackets 23 to the motor block of the internal combustion engine C. The tube 19 may be of a flexible nature so that any vibration between the motor and the body may be compensated for. Hot air is quickly passed into the passenger compartment 21 of the motor vehicle B by my heater A.

The radiator 11 may be of a cast formation with an upper compartment 24 which extends from the intake opening 25 at the front of the radiator 11 and to the back where the compartment 24 connects by the passageway 26 to the lower compartment 27. The compartment 27 connects with the exhaust opening 28 which is adjacent the intake opening 25.

The intake opening 25 may be connected by the pipe 29 to the exhaust manifold 30 of the internal combustion engine C and by means of the valve 31 in the pipe 29 the exhaust gas may be directed or shut off from the radiator 11. When the valve 31 is open, the very hot exhaust gas coming directly from the manifold 30 is passed up through the pipe 29 into the compartment 24 and directed through the opening 26 into the lower compartment 27 and out through the opening 28 to which is connected a flexible exhaust pipe 32 which may carry the exhaust gas out into the open atmosphere or back into the main exhaust pipe 33 leading from the manifold 30.

Thus in operation, my hot air heater A is adapted to operate virtually instantly with the starting of the internal combustion engine C owing to the fact that the exhaust coming into the manifold 30 will be virtually in the nature of a flame, a part of which will be directed through the pipe 29 into the radiator 11, heating the radiator 11 very hot, virtually instantly, and a draft of air increased by the fan 17 of the internal combustion engine will be blown back through the register 20 into the vehicle. The radiator 11 being very hot will cause the air passing through the compartment 13 of the heater A to become very hot and thus an efficient heater will be provided for the motor vehicle.

The simplicity of operation with the efficiency of quick heat for the motor vehicle is desirable. The radiator 11 may be connected by flexible tubes such as 34 and 35 which connect respectively to the intake 25 and the exhaust openings 28, and a valve 36 may be placed within the exhaust pipe 33 if it is desired. This valve 36 with its damper 37 which is rotatable on the pivot 38, may be operated to direct the exhaust gases in the direction of the arrow into the tube 34 leading to the radiator 11, and exhausted out of the tube 35 back to the exhaust pipe 33, as illustrated in the full lines in Figure 4. When the damper 37 is in the position illustrated in dotted outline in Figure 4, the exhaust will pass on through the valve 36 and through the regular exhaust pipe 33 to the muffler, the passages or tubes 34 and 35 being shut off and the heater A will remain inoperative. The connection as in Figure 1 is preferred by reason of the fact that it directs the heat from the exhaust manifold 30 at virtually the hottest point and where the volume is greatest so that the heating radiator 11 will heat up more quickly.

An electric motor and air circulating fan 40 may be placed within the air receiving tube 14 of the casing 10 of the heater A as illustrated in Figure 5, so as to force air through the passageways 13 of the heater A into the motor vehicle body. The radiator 11 is rather of a rectangular nature having a high formation from the bottom to the top with the projecting fins 12 which radiate the heat from the body of the radiator 11 and the casing 10 follows this rectangular formation about the radiator. The back plate 41 is interchangeable with the hood air intake tube 14 at the front end 42 of the casing 10 so that the heater A may be turned around with the intake and exhaust openings 25 and 28 positioned near the back end of the motor C rather than toward the front. The supporting brackets 23 are provided with an adjustable angle bracket 43 which is provided with a series of holes 44 in the ends of the bracket so that the same may be adjusted to adjust the heat of the heater A and also to adjust the position of the bracket 43 in relation to the motor block C. Thus the heater A is adjustable for different types of motor vehicles where the internal combustion engines vary, some of them carrying the exhaust toward the front, while others carry the exhaust from the cylinders directly toward the back, and I have found my heater to be very practical and desirable owing to its flexible structure which permits it to be applied to the uses desired.

The heater A accomplishes results very much to be desired owing to the fact that it virtually instantly throws off hot air into the motor vehicle, the action of the heater being stimulated by the movement of the vehicle and operation of the vehicle's internal combustion engine.

In accordance with the patent statutes I have set forth and pointed out the principles and features of my heater which I believe are adapted to represent the best embodiment thereof, however, obvious changes and adaptations may be accomplished within the scope of the following claims remaining within the purpose and intent of the invention.

I claim:

1. A heater for motor vehicles comprising, a cast iron radiator having a series of heat dispensing fins projecting therefrom, an intake compartment leading along longitudinally of said radiator, an exhaust compartment extending longitudinally of said radiator and connecting with said intake compartment at the back thereof, means for connecting said radiator to a source of heat of an internal combustion engine, a casing spaced about said radiator, brackets for supporting said casing to the internal combustion engine, a downwardly projecting air intake hood mounted on said casing closely adjacent to the air circulating fan of the internal combustion engine, and a hot air tube leading from said casing into the motor vehicle body to heat the same.

2. A heater for motor vehicles including, a radiator, a longitudinal intake compartment in said radiator, a longitudinal exhaust compartment in said radiator, a connecting passage between said compartments at one end thereof, means for connecting the other ends of said compartments to the source of heat of the internal combustion engine of the vehicle, a casing about said radiator, an intake opening into said casing, means for conveying heated air from said casing to said motor vehicle body, and an electrically driven fan in the intake of said casing to force air over said radiator and into said conveying means to the vehicle body.

CARL A. SCHMIDT.